(12) United States Patent
Hanamoto

(10) Patent No.: US 8,368,939 B2
(45) Date of Patent: Feb. 5, 2013

(54) DECODING IMAGE DATA FOR PRINTING

(75) Inventor: Takashi Hanamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 12/877,983

(22) Filed: Sep. 8, 2010

(65) Prior Publication Data

US 2010/0328697 A1    Dec. 30, 2010

Related U.S. Application Data

(63) Continuation of application No. 10/882,177, filed on Jul. 2, 2004, now Pat. No. 7,817,300.

(30) Foreign Application Priority Data

Jul. 3, 2003 (JP) ................................. 2003-191134
May 21, 2004 (JP) ................................. 2004-151984

(51) Int. Cl.
   *G06K 15/00* (2006.01)
(52) U.S. Cl. ...................... 358/1.17; 358/1.16; 358/1.18
(58) Field of Classification Search ................. 358/1.16, 358/1.17, 1.18
See application file for complete search history.

(56) References Cited

U.S. PATENT DOCUMENTS

| | | | |
|---|---|---|---|
| 6,574,002 B1 | 6/2003 | Paczewitz | |
| 6,710,892 B2 | 3/2004 | Narushima | |
| 6,727,909 B1 | 4/2004 | Matsumura et al. | |
| 6,765,691 B2 | 7/2004 | Kubo et al. | |
| 7,010,176 B2 | 3/2006 | Kusunoki | |
| 7,027,172 B1 | 4/2006 | Parulski et al. | |
| 2002/0186413 A1 | 12/2002 | Ito | |
| 2003/0004976 A1 | 1/2003 | Enokida et al. | |
| 2003/0011802 A1 | 1/2003 | Nakagiri et al. | |
| 2004/0085564 A1 | 5/2004 | Peavey et al. | |

FOREIGN PATENT DOCUMENTS

| | | |
|---|---|---|
| EP | 1303132A2 A2 | 4/2003 |
| JP | 9-26865 A | 1/1997 |
| JP | 10-293857 B2 | 11/1998 |
| JP | 2000033743 A | 2/2000 |
| JP | 2000050052 A | 2/2000 |
| JP | 2002312137 A | 10/2002 |
| JP | 2003039765 A | 2/2003 |

*Primary Examiner* — Twyler Haskins
*Assistant Examiner* — Fred Guillermety
(74) *Attorney, Agent, or Firm* — Fitzpatrick, Cella, Harper & Scinto

(57) ABSTRACT

In the conventional printing application, it is impossible to easily overview which image is printed in which page, so that there is a drawback that a user is required to perform the printing while imagining printing result. An idea for more quickly providing the printing result at the same time when the printing is performed by simple operation has not been sufficiently made. In order to solve the problems, a printing apparatus includes decoding means for, before the an instruction is given, decoding the image to be printed in at least a first sheet with the layout selected by layout selecting means among images selected by image selecting means and printing controlling means for effecting the printing of image data decoded by the decoding means, and a printing method includes steps to be executed in the printing apparatus.

4 Claims, 13 Drawing Sheets

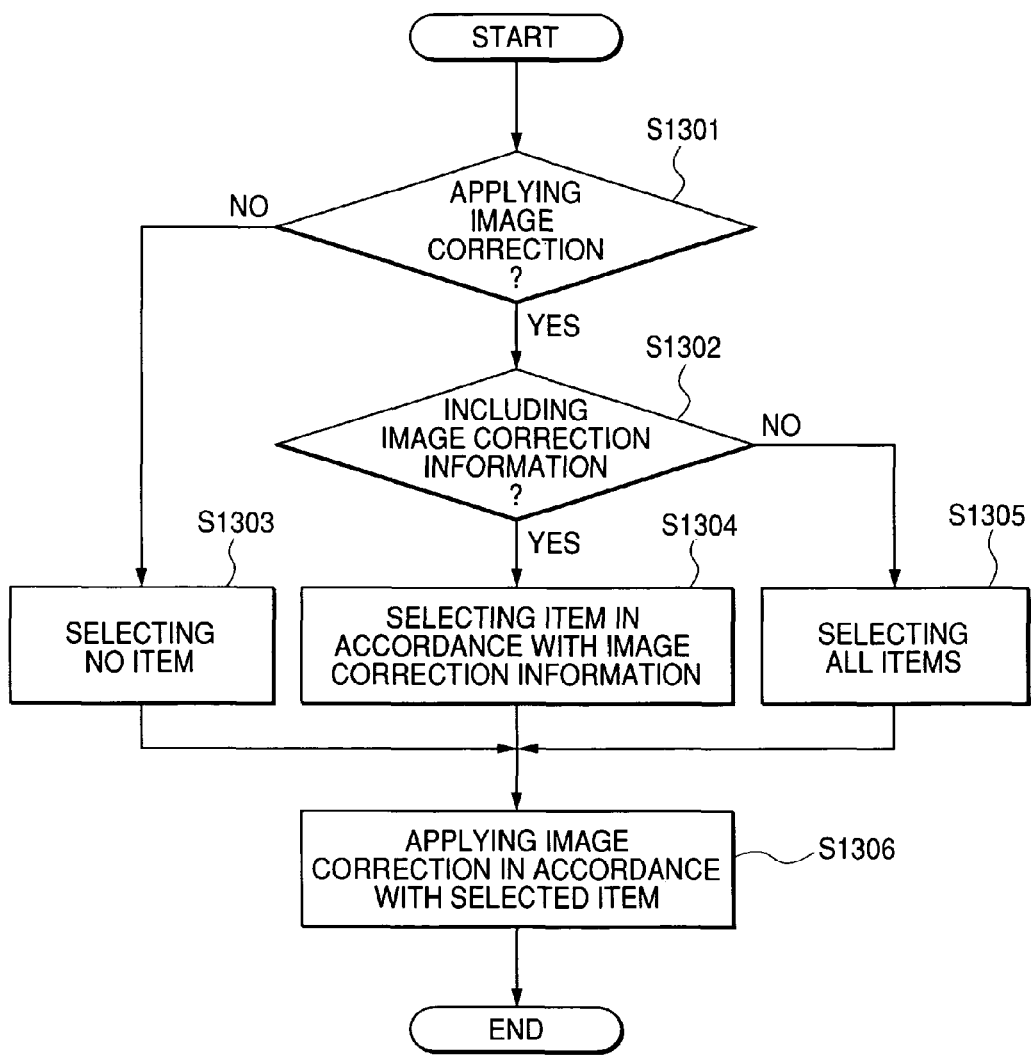

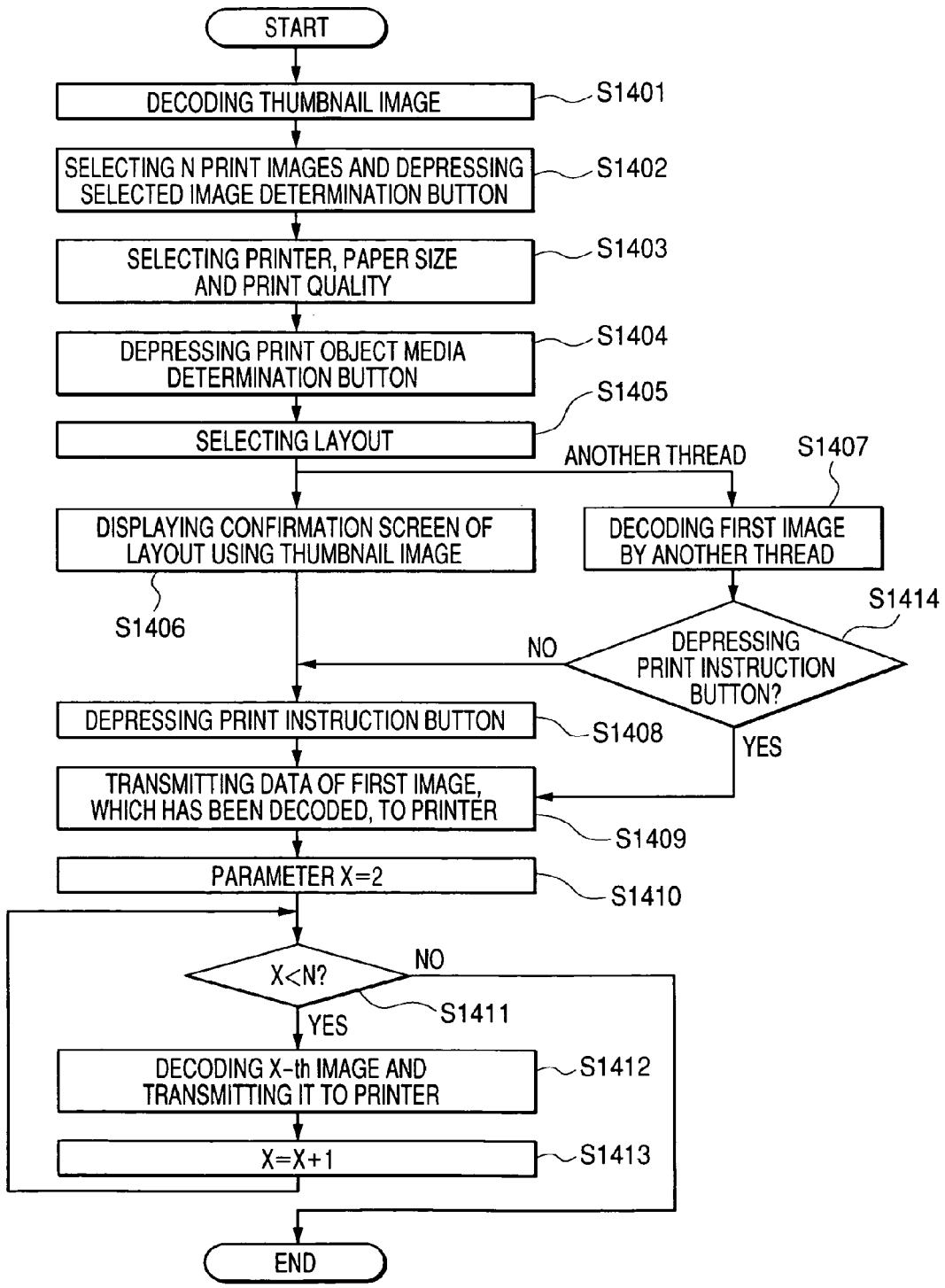

DECODING IMAGE DATA FOR PRINTING

This application is a continuation of U.S. application Ser. No. 10/882,177, filed Jul. 2, 2004 (allowed), the contents of which are incorporated herein by reference.

This application claims priority from Japanese Patent Application Nos. 2003-191134 filed Jul. 3, 2003 and 2004-151984 filed May 21, 2004, which are hereby incorporated by reference.

BACKGROUND OF THE INVENTION

1. Field of the Invention

The present invention relates to a printing apparatus and a printing method for printing an image selected by a user.

2. Related Background Art

Currently, digital cameras become widespread, and various applications which aims to simply perform beautifully printing are developed in order to response demand how the required image is simply printed.

These applications basically include the following three processes.
1. Selection of the image to be subjected to printing
2. Setting of printing paper
3. Setting of a layout Further, in the applications, an idea that user operability is improved by using GUI is made (see Japanese Patent Application Laid-Open No. H10-293857). In the applications, what image is selected can be easily confirmed in such a manner that the image which is to be subjected to a printing is displayed in a thumbnail (reduced display) and the thumbnail is selected by a user. When the printing layout is selected, in many cases, the user can easily imagine a printing result by a preview display using the image actually selected as the printing subject.

However, in the conventional printing applications, only one page of the layout result is displayed, and there is no application which performs reduced displays of all the pages to overview the printing result.

In order to overview a printing preview in which the layout has been performed, there is also the application which can display a preview image by only one page. However, it is impossible to easily overview which image is printed at which page, so that there is a drawback that the user is required to perform the printing while imagining the printing result.

Further, an idea for more quickly providing the printing result at the same time when the printing is performed by simple operation has not been sufficiently made.

SUMMARY OF THE INVENTION

It is an object of the invention to solve all the above-described problems or at least one of the problems.

The feature of the invention is that the overview of the printing result is simplified because the printing result is shown to the user both one page basis and by the thumbnails of the whole when the user selects the layout.

Because the thumbnail images are updated in accordance with the setting of the printer or the setting of the application, the preview close to the actual printing result can be displayed, and there is an advantage that the user can easily imagine the printing result.

Further, before a printing instruction is given, the decoding processing of the image which is to be printed in the selected layout is performed, so that the start of the printing processing can be hastened.

In order to realize the above-described features, a printing apparatus of the invention includes image selecting means for selecting a plurality of images to be printed, layout selection means for selecting a layout of printing, instructing means for instructing performance of the printing of the image selected by the image selecting means, by using the layout selected by the layout selecting means, decoding means for, before the instruction is given by the instructing means, decoding the image to be printed on at least a first sheet with the layout selected by the layout selecting means among the images selected by the image selecting means, and printing controlling means for effecting the printing of image data decoded by the decoding means in response to that the instructing means inputs the instruction of the performance of the printing.

Other objects and features of the invention will be apparent from the following descriptions of the embodiments and the accompanying drawings.

BRIEF DESCRIPTION OF THE DRAWINGS

FIG. 13 is the flow chart showing the flow of an image correction processing in the embodiment; and FIG. 14 is the flow chart showing the flow of printing processing in a third embodiment.

DETAILED DESCRIPTION OF THE PREFERRED EMBODIMENTS

First Embodiment

Figure 1:
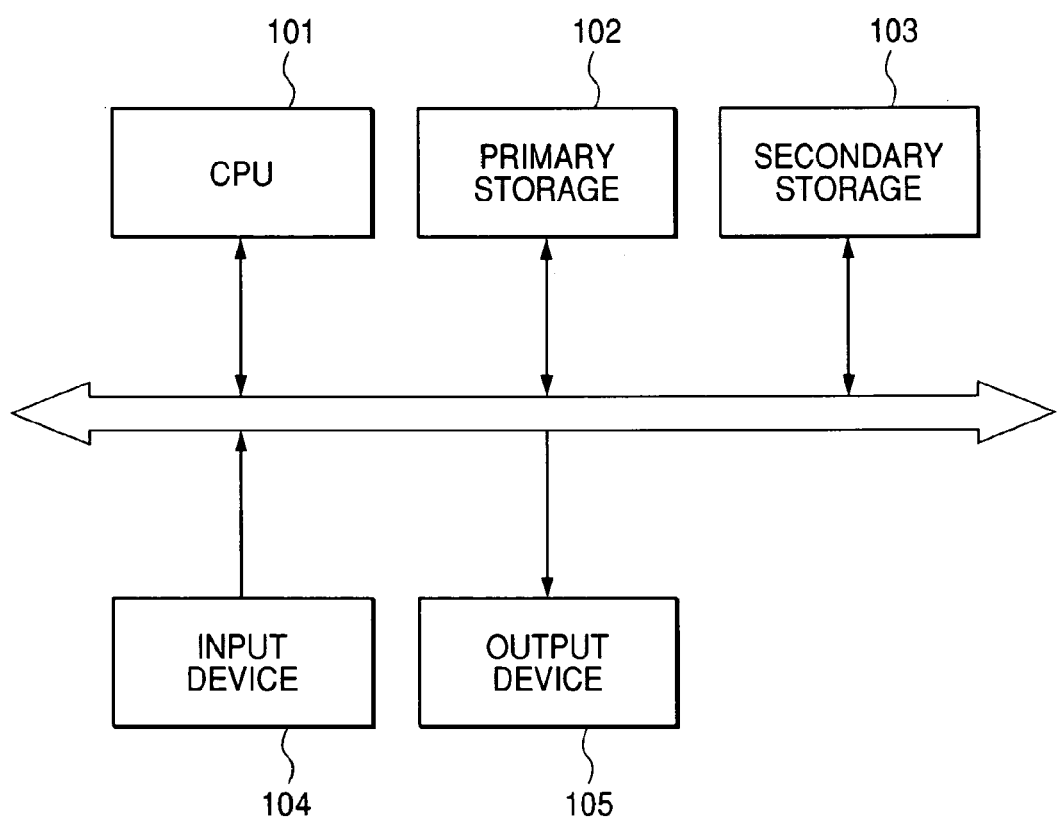
FIG. 1 shows a system configuration in an embodiment.

The present invention will be specifically described referring to the accompanying drawings. FIG. 1 shows an outline of the system realizing a first embodiment. CPU 101 controls an overall operation of the system and performs execution of the program stored in a primary storage 102 and the like. The primary storage 102 is a memory which reads the program stored in a secondary storage 103 and stores the read program. The secondary storage 103 may be, e.g. a hard disk drive. Generally, a storage capacity of the primary memory is smaller than that of the secondary memory, and the program and data which can not be stored in the primary memory are stored in the secondary memory. The data necessary to be stored for a long time is also stored in the secondary memory. In the present embodiment, the program is stored in the secondary storage 103 and read into the primary storage 102 when the program is to be executed, and CPU 101 then executes processing. An input device 104 may be, e.g. a mouse and a keyboard, and the input device 104 is used for transmission of an interrupt signal to the program and the like. An output device 105 may be, e.g. a monitor and a printer. In this apparatus, at least the printer is required because of the feature as the printing apparatus. However, needless to say, generally it is also possible that the apparatus except the printer is used as the output apparatus of the image. Further, although it is noted that there may be various kinds of compositions of the apparatus, the descriptions of those various kinds of compositions will be neglected because those are not the principal feature of the invention.

At first, the outline of the printing apparatus of the invention will be described. In the printing apparatus described of the present embodiment, the image to be subjected to printing, the medium to be subjected to printing, and the layout are designated by GUI. Further, the printing apparatus of the embodiment has an edit function of simply editing the image to be subjected to printing.

Figure 2:
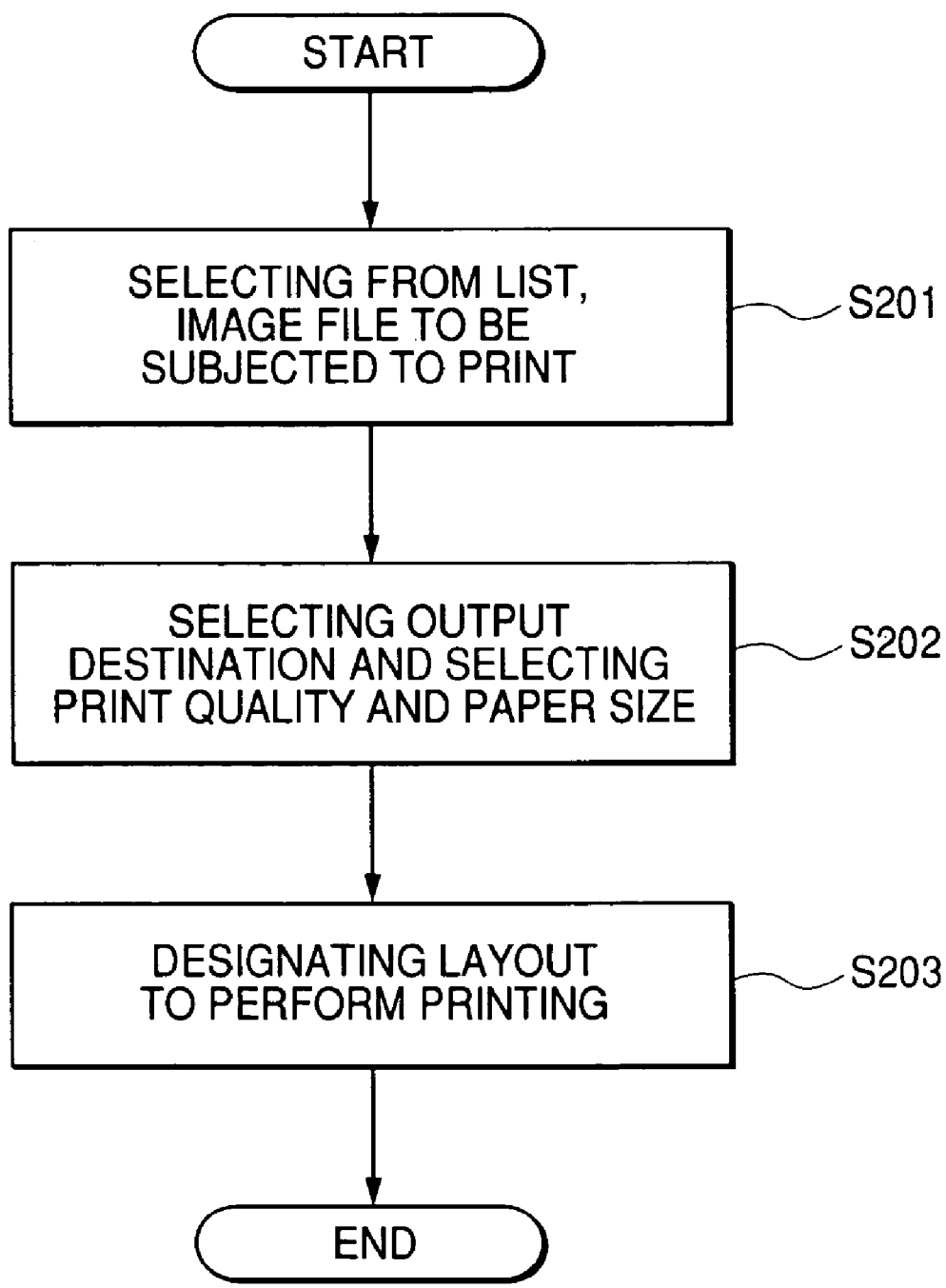
FIG. 2 is a flow chart showing a flow of a printing procedure in the embodiment.

The above-described four functions will be described referring to the drawings. FIG. 2 is a flow chart showing a basic flow of an operating procedure of the printing apparatus of the present embodiment. In Step S201, the image to be subjected to printing is selected. In Step S202, the output printer and the printing paper are selected. In Step S203, the layout is determined to perform the printing. The simple edit is performed by depressing a button prepared on the screen of Step S203 to move to the editing screen. The editing screen is returns to the screen of Step S203 after the edit. Specific examples of the operation in each step will be described referring to the drawings.

Figure 3:
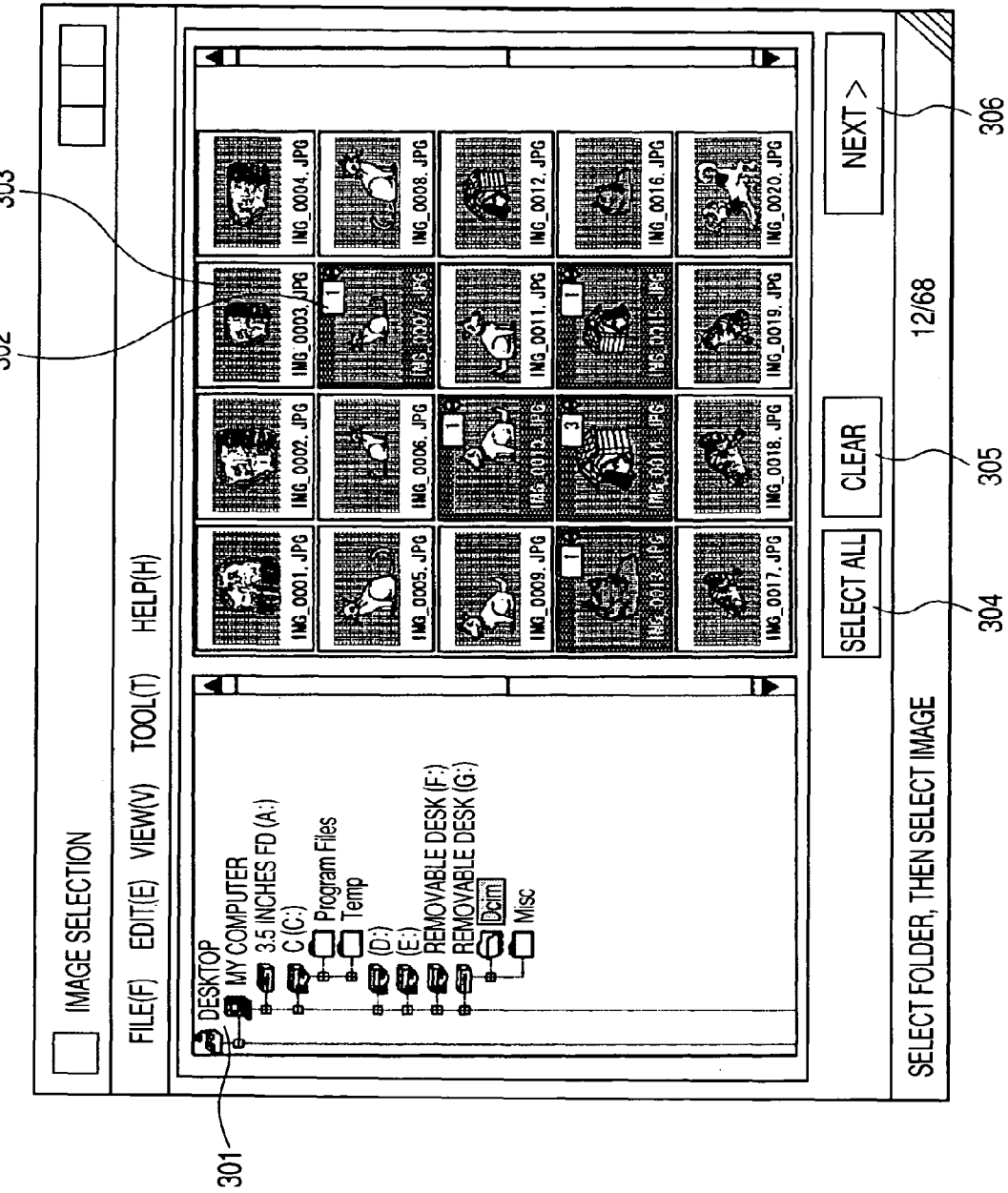
FIG. 3 shows a general outline of an image designating screen in a first embodiment.

FIG. 3 shows a general outline of a screen for designating the image to be subjected to printing in the present embodiment. A folder tree window 301 displays a tree indicating directories constructed in the storage medium included in the printing apparatus. The user can select the directory, in which the necessary data is stored, by following the tree.

When the image file is stored in the selected directory, a thumbnail image (compressed image) is displayed in a thumbnail display window 303. When the user selects the image, a copy count designating icon 302 is displayed on the right shoulder of the thumbnail image. The copy count designating icon 302 shows the number of copies and upward and downward buttons for increasing or decreasing the number of copies. The user can designate the number of copies in each image by selecting the copy count designating icon 302. When the downward button is selected in the state in which the number of copies is set to 1, the copy count designating icon 302 is set to a non-display state.

When a select all button 304 is depressed, the state in which printing all the images stored in the directory selected in the folder tree window one by one is designated. When a clear button 305 is depressed, the printing designation of all the images is canceled. When a selection image determination button 306 is depressed, the screen for designating the image to be subjected to printing goes to a screen for designating the medium to be subjected to printing.

In the embodiment, depressing the select all button 304 generates the state in which printing all the images stored in the selected directory one by one is designated. However, it is also possible that the invention has the configuration, in which depressing the select all button causes the number of copies of each of all the images to be increased by one.

Figure 4:
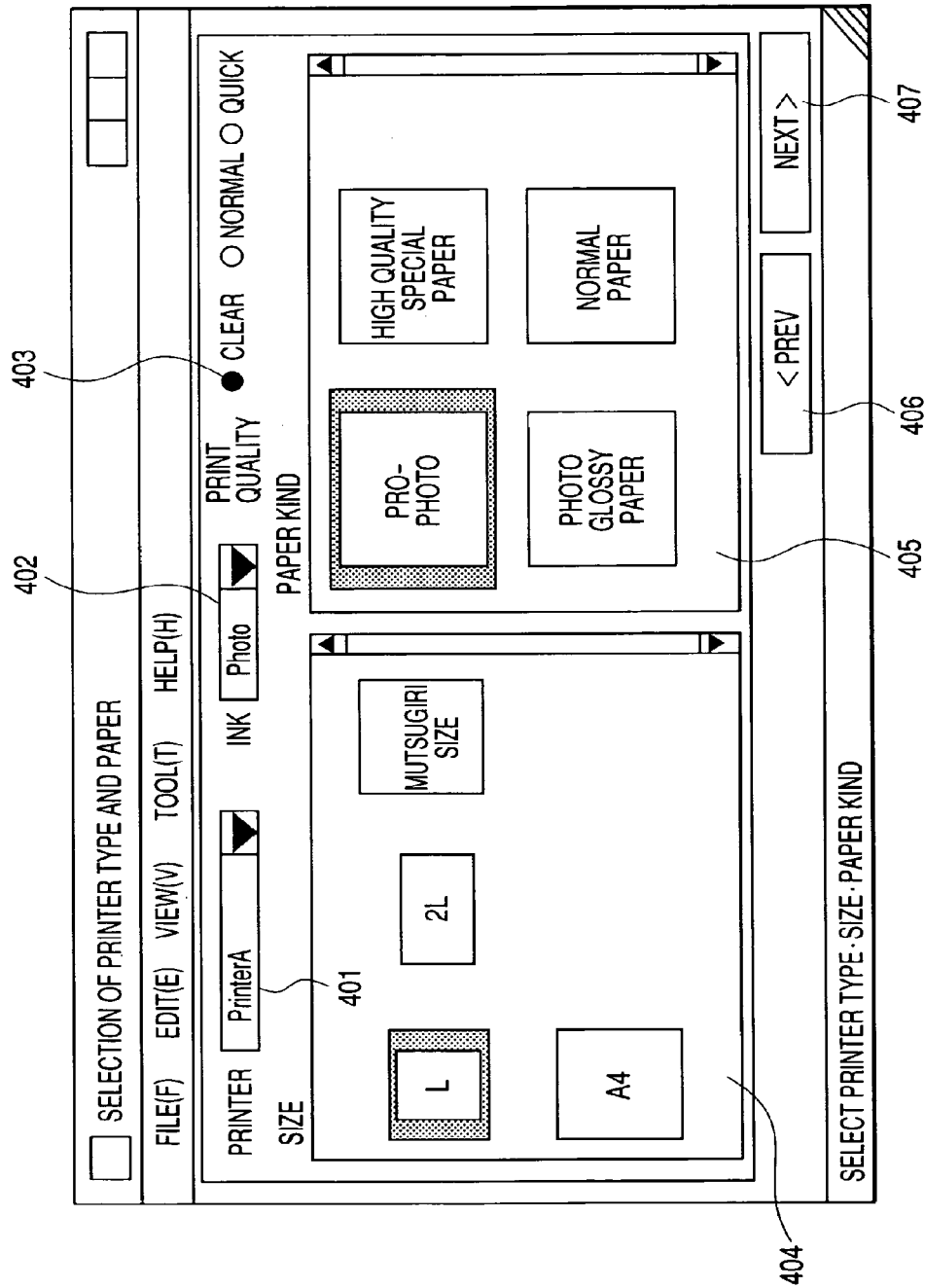
FIG. 4 shows the general outline of an output medium designating screen in the first embodiment.

FIG. 4 shows the general outline of the screen for designating the medium to be subjected to printing in the embodiment. A printer selection menu 401 is a menu for selecting the output printer. The printer selection menu 401 of the embodiment is a pull-down menu which displays a list of the printers connected to the printing apparatus.

In accordance with a type of an output printer selected by the printer selection menu 401, options displayed in an ink cartridge selection menu 402 and a printing quality selection button 403 are properly restricted. Restricting the options allows the user to perform the printing designation without being conscious of the printer type and the corresponding ink. Similarly, a printing size displayed on a size selection window 404 is also restricted to the selectable options in accordance with the output printer type. Further, the options of a paper kind displayed on a paper kind selection window 405 are restricted in accordance with the selected printing size. Therefore, the states of the ink cartridge selection menu 402, the printing quality selection button 403, the printing size selection window 404, and the paper kind selection window 405 are updated, whenever the output printer is changed.

By forming GUI in the above-described manner, the user can easily designate the medium to be subjected to printing in a manner that designates the output destination by the printer selection menu 401 and selects the ink cartridge selection menu 402, the printing quality selection menu 403, and the icons displayed on the size selection window 404 and the paper kind selection window 405.

When a printing medium determination button 407 is depressed, the screen for designating the medium to be subjected to printing goes to a layout designating screen. When an image re-selection button 406 is depressed, the screen for designating the medium to be subjected to printing returns to the screen for designating the image to be subjected to printing.

In the embodiment, a top of the listed options is previously selected in the initial use of the printing apparatus, and the option which the user has selected last time is previously selected in the start up from a second time. Therefore, for the user who uses only the fixed medium, there is the advantage that the user is not required to re-designate the medium to be subjected to printing in each time.

Figure 5:
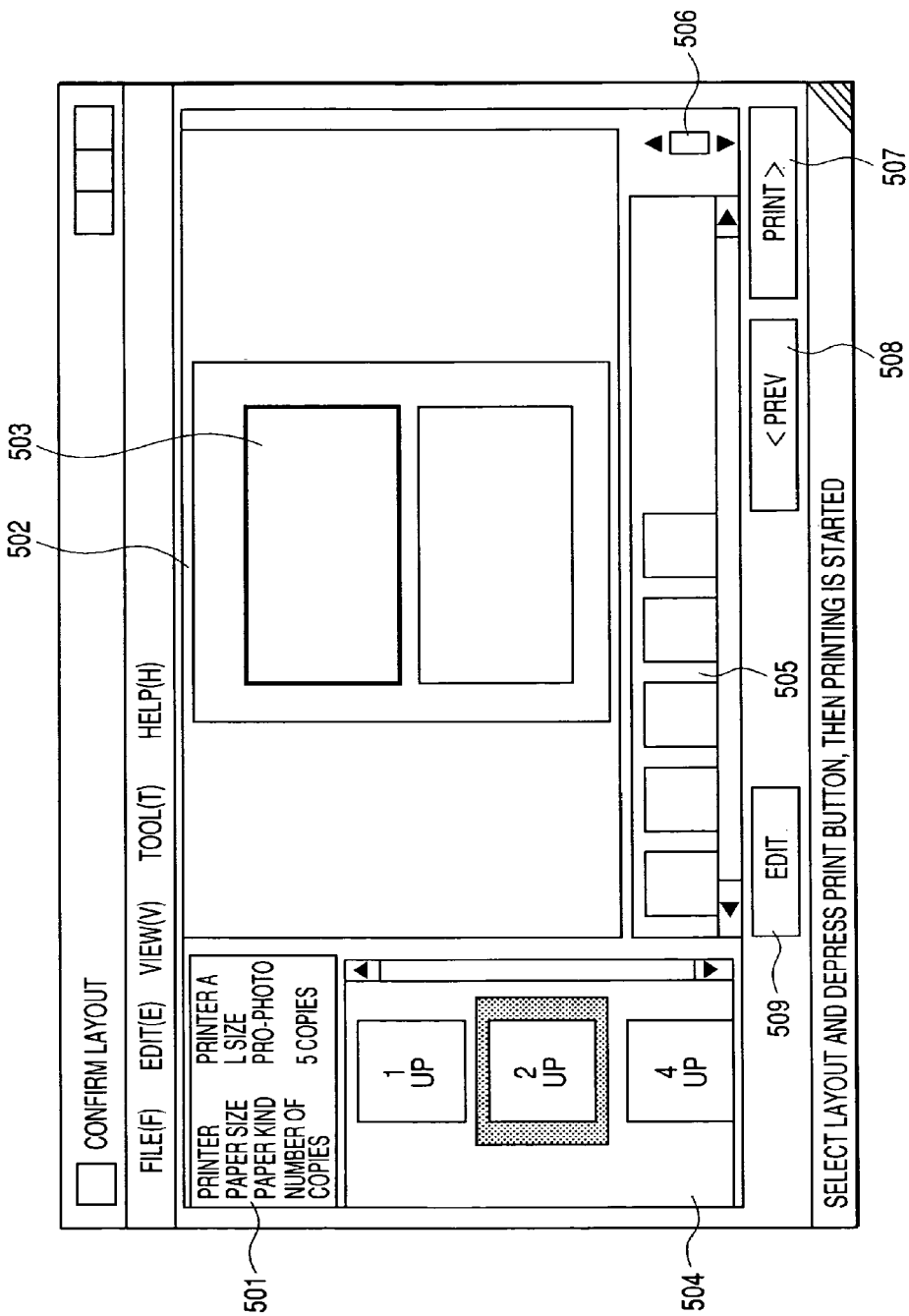
FIG. 5 shows the general outline of a layout designating screen in the first embodiment.

FIG. 5 shows the general outline of the layout designating screen in the embodiment.

In the layout designating screen of the embodiment, a layout selection window 504 displays the layout options in accordance with the image to be subjected to printing which has been designated in the screen for designating the image to be subjected to printing and the medium to be subjected to printing which has been designated in the screen for designating the medium to be subjected to printing, a printing list window 505 displays the list of the printing previews in accordance with the layout which has been selected by the layout selection window 504, and a printing preview window 502 displays the preview of the page which has been selected by the printing list window 505.

A preview image displayed on the printing preview window 502 can be selected by using the mouse or the like, and the selected image is displayed with a frame on a preview selection window 503. The user can move the layout designating screen to an edit screen by depressing an edit button 509 to simply edit the image selected by the preview selection window 503. The general outline of a simple edit screen will be described later.

The user can arbitrarily select the options of the layout displayed on the layout selection window 504 whenever the layout designating screen is displayed. When the selected layout is changed, the information of the printing list window 505 and the information of the printing preview window 502 are updated. A page displayed on the printing preview window 502 displays the page including the image selected by the preview selection window 503. In the initial state of the layout designating screen, the image of the top of the images to be subjected to printing is selected by the layout designating screen. Therefore, the user can preview the output result in accordance with the layout to select the optimum layout.

When the same medium to be subjected to printing as the medium to be subjected to printing designated at the start-up immediately before is selected, similarly to the screen for the medium to be subjected to printing, the layout started up and selected immediately before is also set to the initial state in the layout designating screen.

The designation of the number of copies is performed by a copy count setting menu 506. A numeric character displayed in the center indicates the number of copies which is designated by the arrow buttons vertically arranged. When the upward arrow button is depressed, the number of copies is increased by 1. When the downward arrow button is depressed, the number of copies is decreased by 1. However, the number of copies is never decreased less than 1.

When a print instruction button 507 is depressed, the printing is performed to terminate all the processes.

Figure 6:
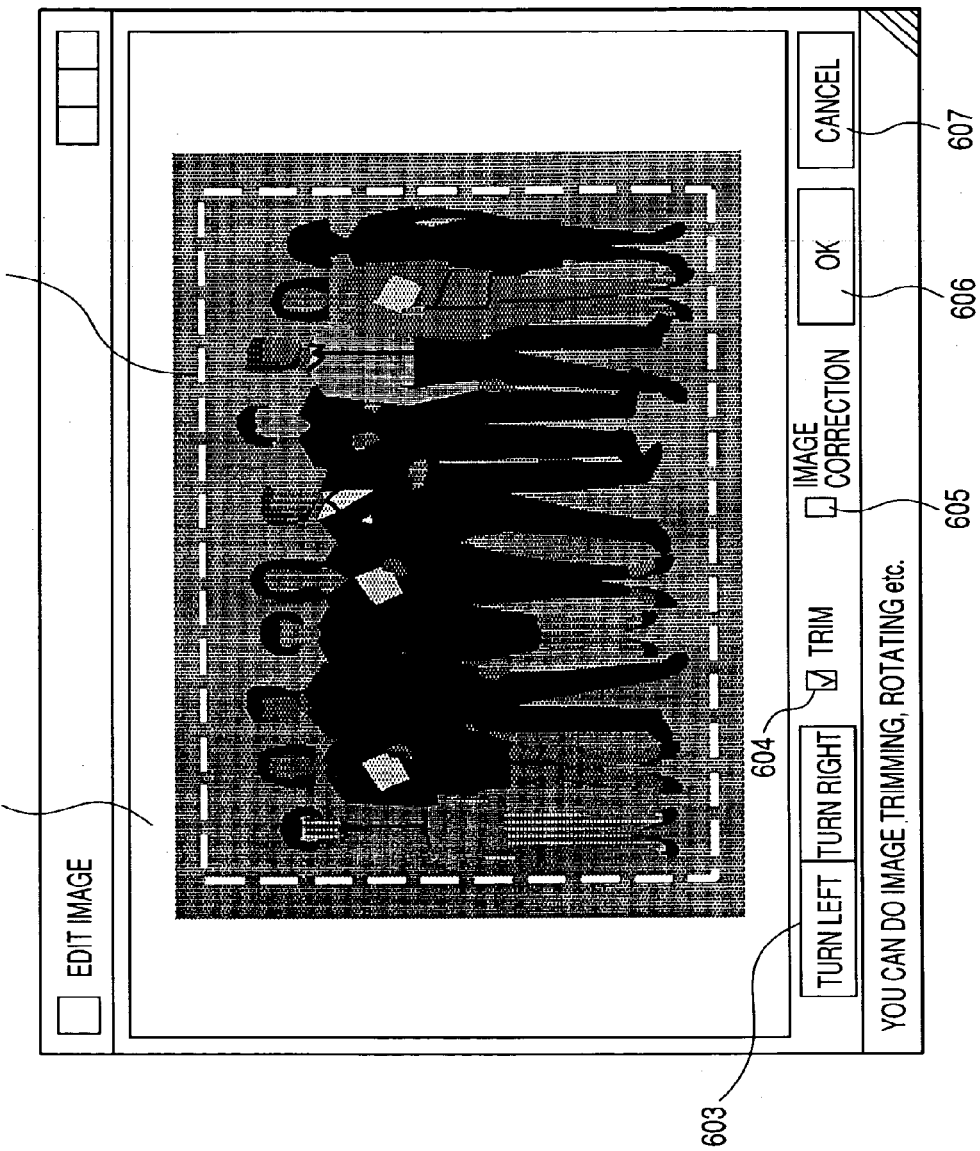
FIG. 6 shows the general outline of an image editing screen in the first embodiment.

FIG. 6 shows the general outline of the simple edit screen in the present embodiment. The image selected by the preview selection window 503 is displayed in an image display window 601. A trimming area display window 602 in a rectangular shape having an aspect ratio according to the medium to be subjected to printing is displayed in the image display window 601. The trimming area display window 602 shows the area after the trimming. In the trimming area display window 602, the size and the position can be changed by a pointing device such as the mouse. Rotation of the image is performed by a rotation button 603. In the embodiment, the image is rotated 90° clockwise by a turn right button, and the image is rotated 90° counterclockwise by a turn left button. In the trimming area display window 602, the display position is also changed in accordance with the rotation.

When a checkmark in a trimming designating checkbox 604 is eliminated, the trimming is canceled. When the checkmark in an image correction designating checkbox 605 is eliminated, color correction of the image to be subjected to the printing is canceled. A detail flow of image correction processing will be described later.

When a determination button 606 is depressed, the preview images displayed in the printing preview window 502 and the printing list window 505 are updated on the basis of the result of the simple edit to be reflected in the output of the printer. When a cancel button 607 is depressed, no change is applied and the simple edit screen returns to the layout selection screen.

FIG. 13 is the flow chart showing the flow of the image correction processing. In Step S1301, it is checked whether the image correction processing is to be applied or not. When the image correction processing is not applied, the flow goes to Step S1303 to cause all correction items to be non-selective. When the image correction processing is applied, it is checked whether the image file which is to be subjected to Step S1302 includes image correction information or not. When the image file includes the image correction information, the flow goes to Step S1304 to select the item to which the image correction processing is applied. For example the image correction information includes a shooting mode, an exposure mode, an exposure time, and a white balance mode in taking the image. When the image file does not include the image correction information, the flow goes to Step S1305 to select the correction item by the predetermined processing. In the embodiment, all the correction items are selected for the image file which is not pursuant to Exif 2.2. However, it is also possible that only the required items are automatically selected by analyzing the color information of the image or the like.

In Step S1306, the image correction processing is applied in accordance with the correction items selected in Step S1303 to Step S1305 to terminate the processing.

As described above, according to the printing apparatus, while the preview is confirmed, the optimum layout is easily determined to perform the printing.

Second Embodiment

The printing apparatus of the first embodiment has the configuration in which the designation is performed in order of the image to be subjected to printing, the medium to be subjected to printing, and the layout. However, for the designation of the image to be subjected to printing and the designation of the medium to be subjected to printing, it is not necessary to fix the operation order. Further, for the designation of the layout, it is also possible that the operation order of these three functions is not fixed by adding the processing of the case of the non-designation. In addition to the configuration of the first embodiment, an example of GUI including the function of directly jumping to each step in the three steps will be described in a second embodiment.

Figure 7:
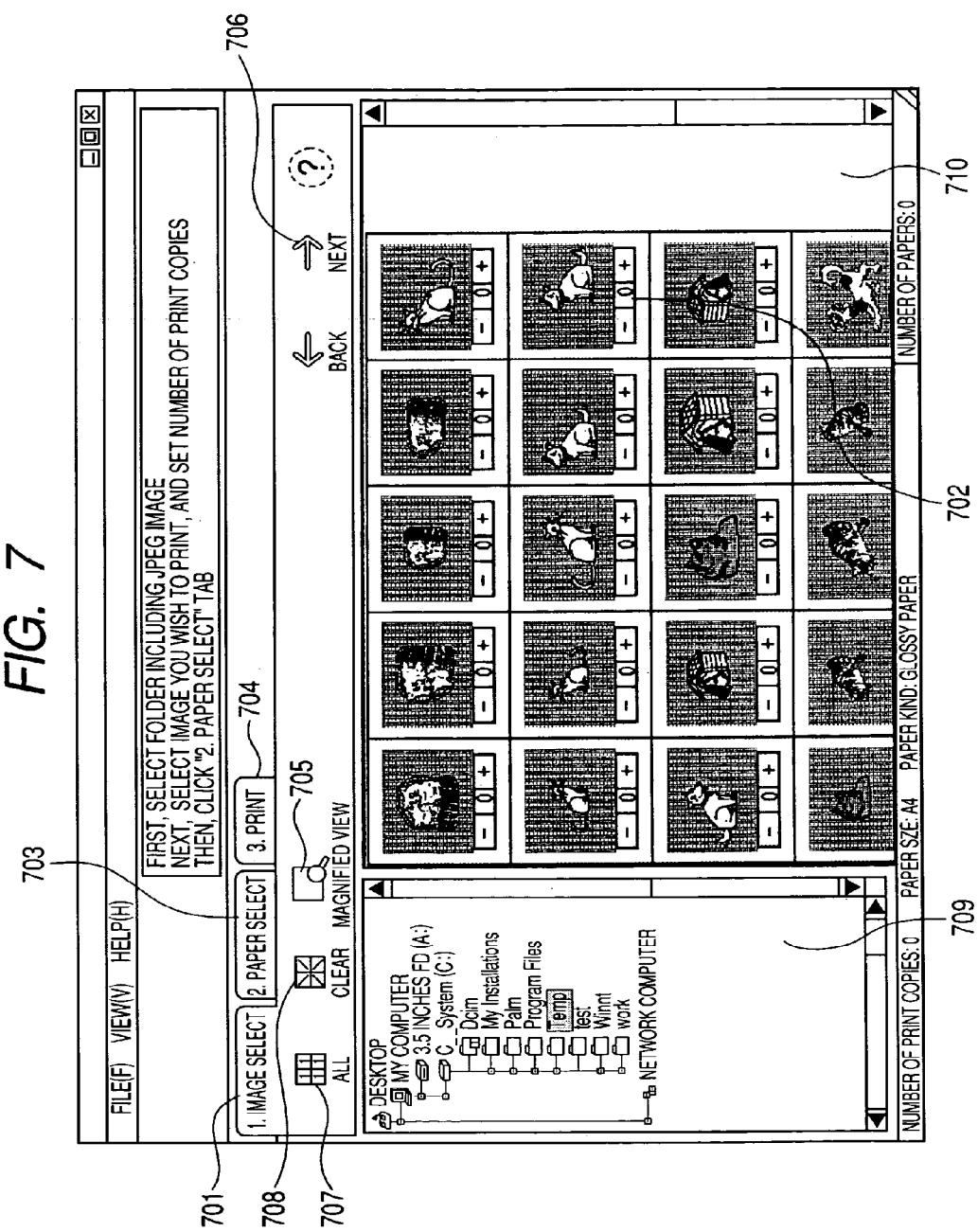
FIG. 7 shows the general outline of the image designating screen in a second embodiment.

FIG. 7 shows the general outline of the screen for designating the image to be subjected to printing in the second embodiment. A folder tree window 709 displays a tree indicating directories constructed in the storage medium included in the printing apparatus. The user can select the directory, in which the necessary data is stored, by following the tree. When the image file is stored in the selected directory, the thumbnail image (reduced image) is displayed in a thumbnail display window 710.

Figure 10:
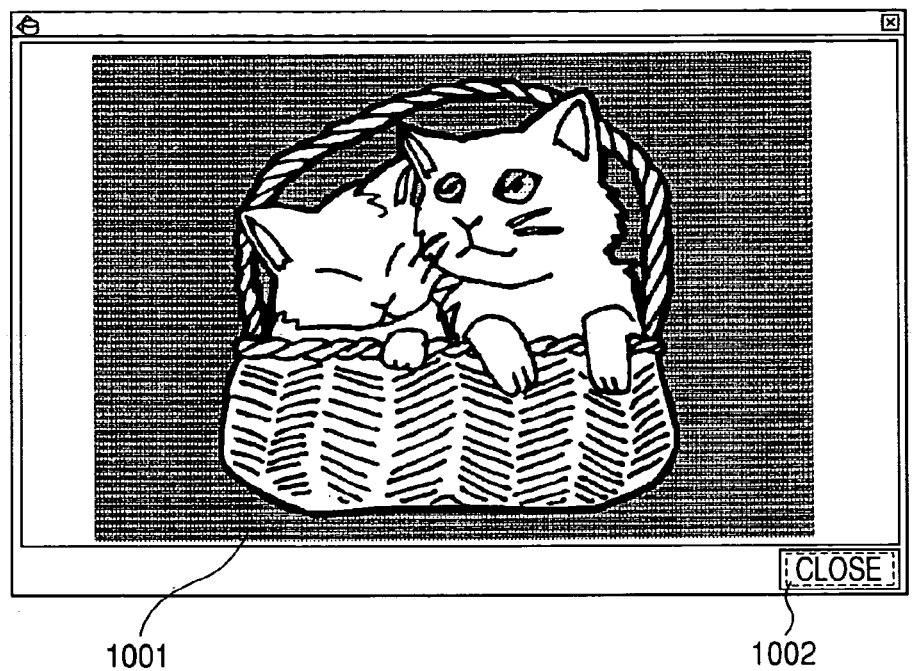
FIG. 10 shows the general outline of an enlarged display screen in the second embodiment.

When a magnified view button 705 is depressed while the image is selected on the thumbnail display window 710, a magnified view window shown in FIG. 10 is displayed. The image which becomes the selection subject can be confirmed in detail by the magnified view window. When a determination button 1002 on the magnified view window is depressed, the magnified view window is closed.

In the present embodiment, the selection of the number of copies is performed by a copy count selection button 702. The copy count selection button comprises a seesaw switch. When the right side of the copy count selection button 702 is depressed, the printing count displayed in the center of the copy count selection button 702 is increased by 1. When the left side of the copy count selection button 702 is depressed, the printing count is decreased by 1. When the copy count becomes 0, the left side of the copy count selection button 702 is disabled. When the copy count becomes 99, the right side of the copy count selection button 702 is disabled.

When a select all button 707 is depressed, this results in the state in which printing all the images stored in the directory selected in the folder tree window one by one is designated. When a clear button 708 is depressed, the printing designation of all the images is canceled. When a selection image determination button 706 is depressed, the screen for designating the image to be subjected to printing goes to a screen for designating the medium to be subjected to printing.

When the image file having the designated printing count not lower than 1 exists, a paper selection tab 703 and a printing tab 704 are enabled. When the image file having the designated printing count not lower than 1 does not exist, the paper selection tab 703 and the printing tab 704 are disabled.

When the paper selection tab 703 is depressed, the screen for designating the image to be subjected to printing goes to a screen for designating the medium to be subjected to printing. When the printing tab 704 is depressed, the screen for designating the image to be subjected to printing goes to the layout designating screen. When the selection image determination button 706 is depressed, similarly to the first embodiment, the screen for designating the image to be subjected to printing goes to a screen for designating the medium to be subjected to printing.

Figure 8:
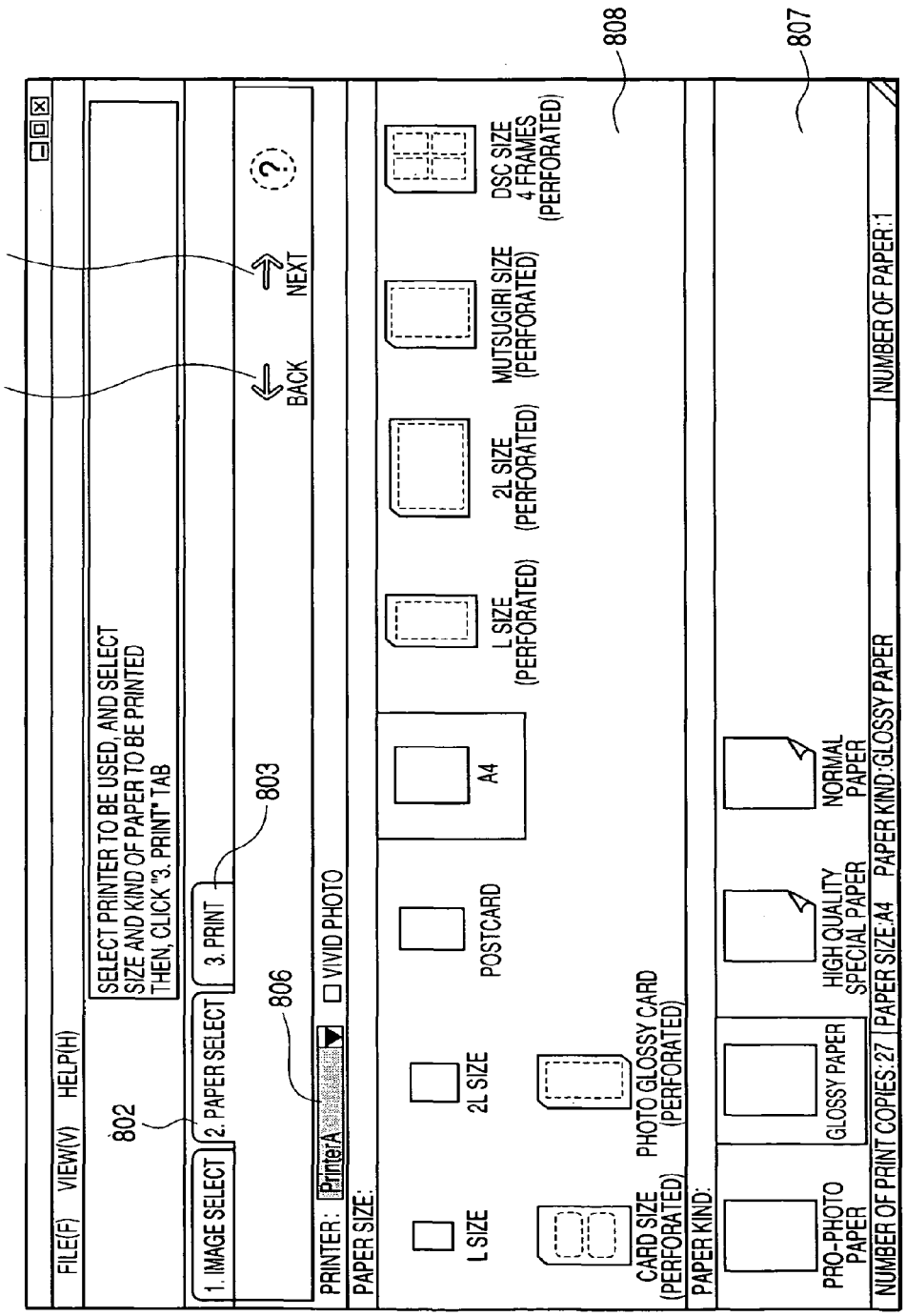
FIG. 8 shows the general outline of the output medium designating screen in the second embodiment.

FIG. 8 shows the general outline of the screen for designating the medium to be subjected to printing in the second embodiment. A printer selection menu 806 is a menu for selecting the output printer. The printer selection menu 806 of the present embodiment is a pull-down menu which displays a list of the printers connected to the printing apparatus. The checkbox labeled "VIVID PHOTO" located on the right side of the printer selection menu 806 designates whether a special process prepared by a printer driver is applied or not. The checkbox becomes valid only when the "VIVID PHOTO" function is valid in the printer selected by the printer selection menu 806. Although the "VIVID PHOTO" function was cited as an example of the special process provided by the printer driver in the embodiment, needless to say, it is possible that other processes are applied as the special process.

The options, which are displayed in a printing size selection window 808 and a paper kind selection window 807, are properly restricted in accordance with a type of the output printer selected by the printer selection menu 806. Restricting the options allows the user to perform the printing designation without being conscious of the printer type and the corresponding ink. Further, the options of the paper kind displayed on the paper kind selection window 807 are restricted in accordance with the paper size selected by the printing size selection window 808. Therefore, the states of the printing size selection window 808 and the paper kind selection window 807 are updated, whenever the output printer is changed. The state of the paper kind selection window is also updated whenever the paper size is changed.

The ink cartridge designating menu and the printing quality menu are prepared in the first embodiment. On the other hand, in the second embodiment, the ink cartridge designating menu is displayed only when the predetermined printer is selected. The function corresponding to the printing quality selection button of the first embodiment is designated by the selection screen described later.

When a medium to be subjected to printing determination button 804 or a paper selection tab 802 is depressed, the screen for designating the medium to be subjected to printing goes to the screen for designating the image to be subjected to printing. When an image re-selection button 805 or a printing tab 803 is depressed, the screen for designating the medium to be subjected to printing goes to the layout designating screen.

Similarly to the first embodiment, in the second embodiment, the top of the listed options is previously selected in the initial use of the printing apparatus, and the option which the user has selected last time is previously selected in the start up form a second time.

Figure 9:
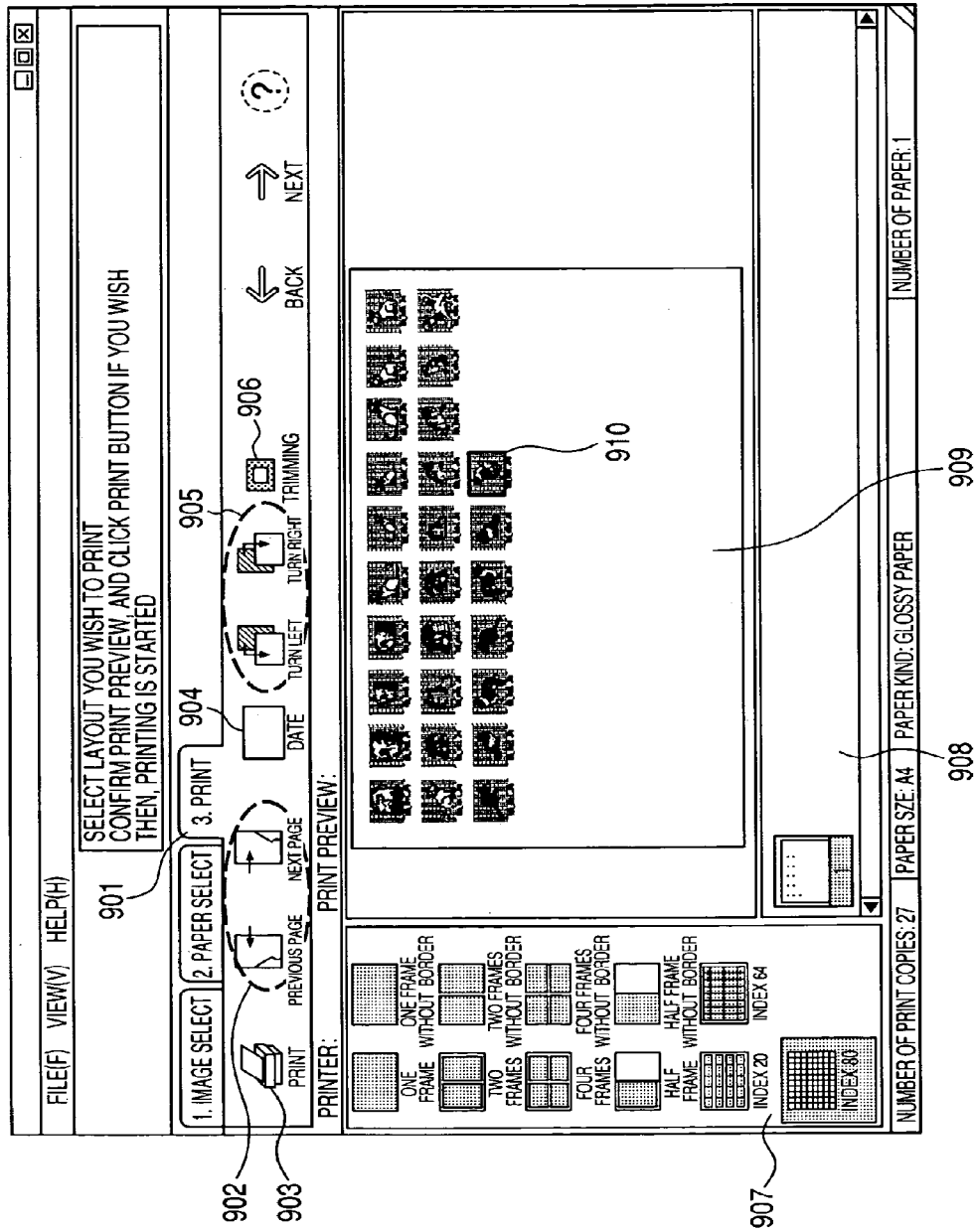
FIG. 9 shows the general outline of the layout designating screen in the second embodiment.

FIG. 9 shows the general outline of the layout selection screen in the second embodiment.

In the layout designating screen of the present embodiment, a layout selection window 504 displays the layout options in accordance with the image to be subjected to printing which has been designated in the screen for designating the image to be subjected to printing and the medium to be subjected to printing which is designated in the screen for designating the medium to be subjected to printing, a printing list window 908 displays the list of printing previews in accordance with the layout which is selected by the layout selection window 907, and a printing preview window 909 displays the preview of the page which is selected by the printing list window 908.

Similarly to the first embodiment, the user can arbitrarily select the layout displayed on the layout selection window 907. When the selected layout is changed, the information of the printing list window 908 and the information of the printing preview window 909 are updated. The page displayed on the printing preview window 909 displays the page including the image selected by a preview selection window 910. In the initial state of the layout designating screen, the image of the top of the images to be subjected to printing is selected by the preview select selection window.

When the same medium to be subjected to printing as the medium to be subjected to printing designated at the start up immediately before is selected, similarly to the screen for the medium to be subjected to printing, the layout started up and selected immediately before is also set to the initial state in the layout designating screen.

The preview image displayed on the printing preview window 909 can be selected by using the mouse or the like, and the selected image is displayed with the frame on the preview selection window 910. The user can perform the simple edit of the image selected by the preview selection window 910 in such a manner that the user depresses an edit button 906 to move the layout selection screen to the edit screen shown in FIG. 11. The general outline of the simple edit screen will be described later.

The rotation button is included in the simple edit screen in the first embodiment. On the other hand, a rotation button 905 is included in the layout selection screen in the second embodiment. When the rotation button 905 is depressed, the image is rotated 90° clockwise or counterclockwise in accordance with the turn right button or the turn left button. The point located as close as possible to the center of the area displayed on the printing preview window 909 is selected as the central point of the rotation. The image is caused to circumscribe the printing area while the aspect ration of the image is held in the initial state. Namely, the image is arranged so that a blank space is not formed in the printing area. Whether the subject image is caused to circumscribe or inscribe the printing area can be designated by the setting screen described later.

When a date printing button 904 is depressed, a date display is added to the images of the printing list window 908 and the printing preview window 909 to update the display. When the date printing button 904 is depressed again, the date display is canceled to update the display. However, the date printing button 904 becomes invalid when the layout is designated to index printing. In this case, the date display is not added at any times. In the present embodiment, the date display is not performed during the index printing. However, it is also possible that the date printing is applied in spite of the kind of the layout.

A next page button 902 is a button for changing a current page in the printing list window 908, and the display of the printing preview window 909 is also updated when the next page button 902 is depressed. At this point, the image selected by the preview selection window 910 is changed to the initial image of the current page after the change.

Similarly to the first embodiment, the layout selection screen returns to the screen for designating the medium to be subjected to printing when the paper re-selection button is depressed. When the image selection tab is depressed, the layout selection screen returns to the screen for designating the image to be subjected to printing. When the paper selection tab is depressed, the layout selection screen returns to the screen for designating the medium to be subjected to printing.

Figure 11:
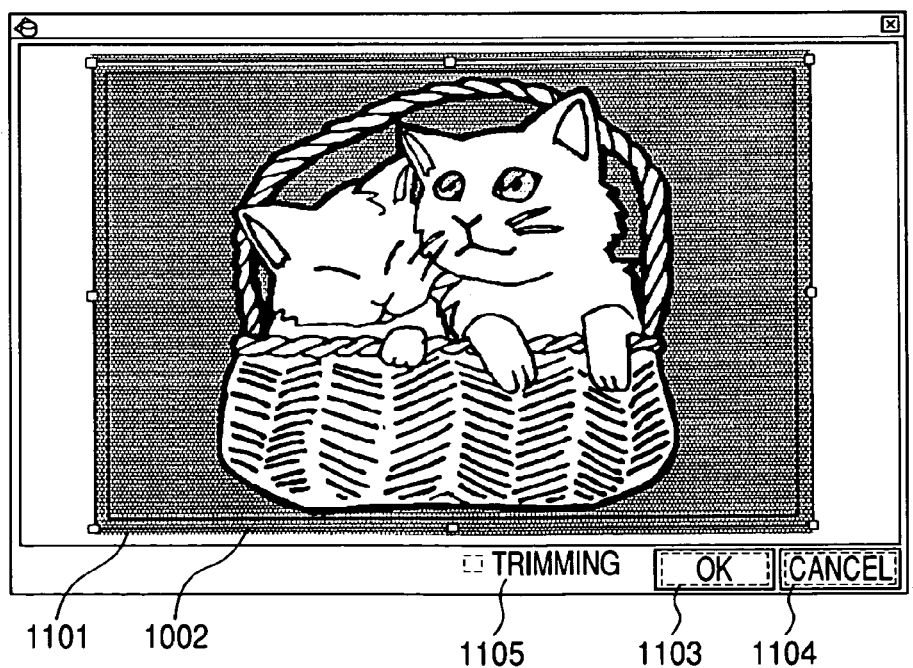
FIG. 11 shows the general outline of a trimming designating screen in the second embodiment.

FIG. 11 shows the general outline of the simple edit screen in the second embodiment. The image selected by the preview selection window 910 is displayed on an image display window 1101. A trimming area display window 1102 in the rectangular shape having the aspect ratio according to the medium to be subjected to printing is displayed in the image display window 1101. The trimming area display window 1102 shows the area after the trimming. In the trimming area display window 1102, the size and the position can be changed by the pointing device such as the mouse.

The trimming area display window 1102 shown in FIG. 11 has the double rectangular frames. Because the whole designated area of the image can not be printed depending on the printer, sometimes frameless printing is realized by slightly running off the edge. In this case, the trimming area is different from the actually printed area. In the double frames of FIG. 11, the outer frame shows the trimming area and the inner frame shows the actually printed area. When the trimming area corresponds to the actually printed area unlike the frameless printing, the trimming area is displayed by using not the double rectangular frames but one rectangular frame.

In the first embodiment, whether the image correction processing is applied or not is designated by the simple edit screen. On the other hand, in the second embodiment, the application of the image correction processing is designated by the setting screen which is separately prepared. The setting screen will be described later.

When the checkmark in a trimming designating checkbox 1105 is eliminated, the trimming is canceled. When a determination button 1103 is depressed, similarly to the first embodiment, the preview images displayed in the printing preview window and the printing list window are updated on the basis of the trimming result to be reflected in the output of the printer. When a cancel button 1104 is depressed, no change is applied and the simple edit screen returns to the layout selection screen.

Figure 12:
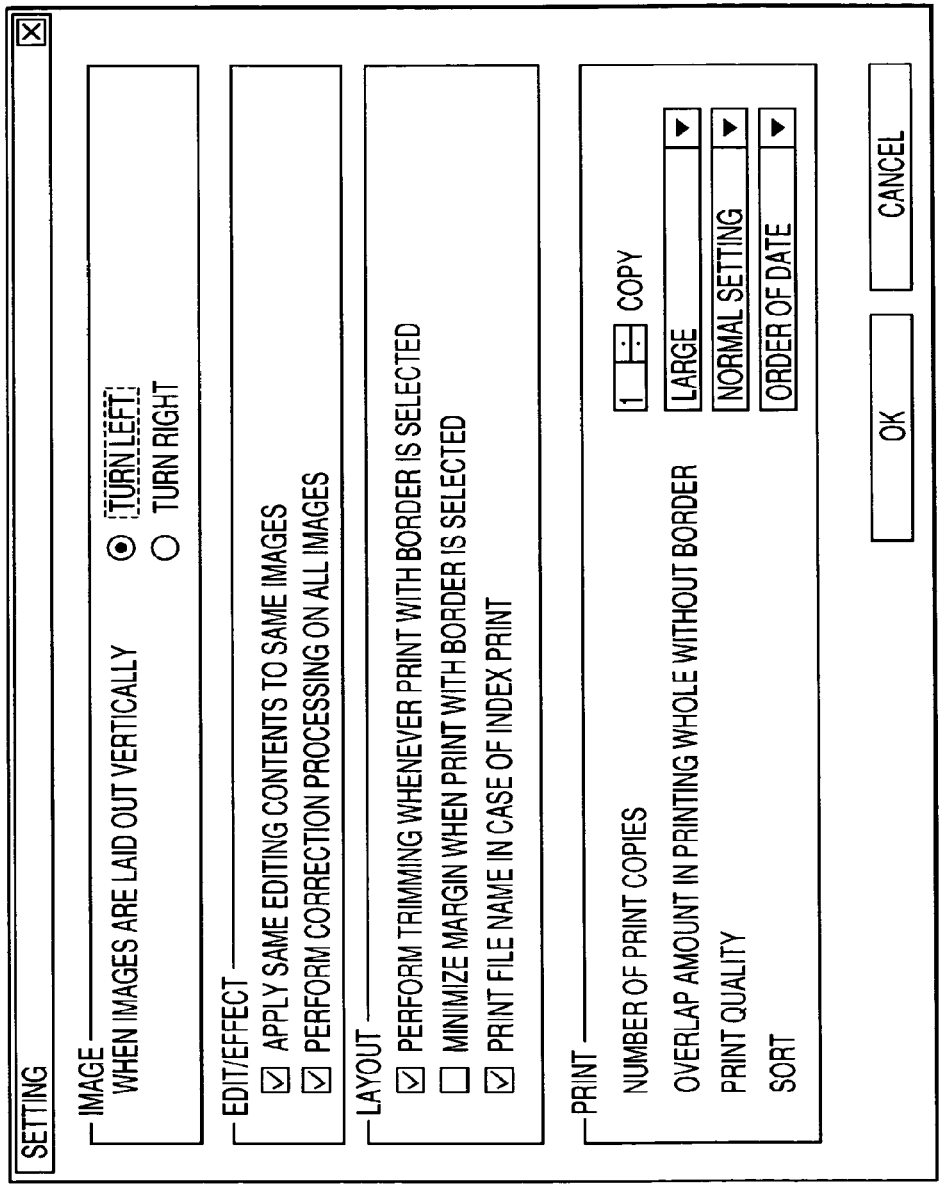
FIG. 12 shows the general outline of an option designating screen in the second embodiment.

FIG. 12 shows the outline of the setting screen in the embodiment.

At first, the setting item of "IMAGE" will be described.

The item of "When images are laid out vertically" designates the rotating direction of the image when the rotation of the image is required according to the printing area. For example, "one frame" in which one designated image is printed in one sheet of paper differs from "two frames" in which two designated images are printed in one sheet of paper in the orientation of the image when the paper is held with the shorter side at the top. In this case, the item of "When images are laid out vertically" designates the rotating direction of the image.

Then, the setting items "EDIT/EFFECT" will be described.

The item of "Apply same editing contents to same images" designates whether the edit is applied to all the output images or not when applying the rotation or the trimming of the image in which the plurality of copies is designated. When the checkmark in the checkbox of "Apply same editing contents to same images" is eliminated, even if the polarity of copies of the same files are designated, the different trimming can be performed to each of the images.

The item of "Perform correction processing on all images" designates whether the image correction processing shown in FIG. 13 in the first embodiment is uniformly applied to all the images or not.

Then, the setting item of "LAYOUT" will be described.

The item of "Perform trimming whenever print with border is selected" designates whether the image is caused to circumscribe or inscribe the printable area when the aspect ratio of the printable area is different from the aspect ratio of the image. When the checkbox of "Perform trimming whenever print with border is selected" is marked, the image is caused to circumscribe the printable area. Therefore, the image is printed throughout the printable area, but a part of the image can not be printed. On the contrary, when the checkmark in the checkbox of "Perform trimming whenever print with border is selected" is eliminated, the whole of the image is always printed, but the blank space is generated in the printing result in accordance with difference of the aspect ratio. In the initial state, the checkbox of "Perform trimming whenever print with border is selected" is always marked when the printing with the border is selected.

The item of "Minimize margin when print with border is selected" is the designation which becomes important in the case of the use of the printer in which the printable area does not correspond to a printing guarantee area. The printable area means the area where the printer can print with ink. The printing guarantee area means the area which guarantees that the printing can be performed with predetermined image quality in the printable area. Depending on a feeding system of the paper of the printer, sometimes the printable area and the printing guarantee area are different from each other. When the checkbox of "Minimize margin when print with border is selected" is marked, the image to be subjected to printing is arranged only in consideration of the printable area. When the checkmark in the checkbox of "Minimize margin when print with border is selected" is eliminated, the image to be subjected to printing is arranged so as to remain in the printing guarantee area. In the initial state, the checkbox of "Minimize margin when print with border is selected" is not marked when the printing with the border is selected.

The item of "Print file name in the case of index print" literally designates whether a file name with the image is printed or not in the case of the index printing. In the initial state, the checkbox of "Print file name in case of index print" is marked when the printing with the border is selected.

Finally, the setting item of "PRINT" will be described. The designation of the number of copies which is prepared in the layout designating screen of the first embodiment, or the amount of run-off from the edge in the printing without border, the setting of the printing quality, the order of the images in the printing, or the like is performed in the setting item of "PRINT."

All the items set in the above-described setting screen are reflected in the preview in the layout designating screen. Therefore, when the printing apparatus of the invention is used, the user can obtain the printing result as the user views the image in the preview.

Third Embodiment

The method in which the optimum layout is determined to perform the printing while the preview is confirmed was described in the first embodiment. In this case, after the print instruction button 507 of FIG. 5 is depressed, the image file is decoded to start the printing processing. When the image size is larger, sometimes the processing time for actually starting the printing becomes longer and it is necessary that the user waits for a long time. Therefore, the method of shortening the time for starting the printing will be described in a third embodiment.

Because the third embodiment has the same system configuration as the first embodiment, the description of the system configuration will be neglected.

FIG. 14 is the flow chart for explaining the process of shortening the time for starting the printing. When the application is started up, the thumbnail of the image file is decoded to display the image designating screen of FIG. 3 in Step S1401. In Step S1402, the user selects N images to be printed on the image designating screen to depress the selection image determination button 306. In Step S1403, the user selects the printer type to be used for printing, the paper size, and the printing quality on the screen for designating the printer type and the paper of FIG. 4. In Step S1405, the printing layout is designated. In Step S1406, the layout confirming screen of FIG. 5 is displayed by using the decoded thumbnail images to wait for the depression of the printing (Step S1408). After the layout is selected in Step S1405, in parallel with the processing of Step S1406, another thread is started up, and the image (the compressed image data) to be printed in the first sheet in the case when the selected layout is used is read out from the recording medium 102 (for example, the hard disk drive or a memory card can be utilized) to decode the compressed image data (release the compressed state). In the foregoings, it is described that only the image to be printed in the first sheet is decodes. However, it is possible the images of the plurality of sheets are performed before the printing instruction is input as long as a memory capacity permits.

Alternatively, it is possible to decode only the number of copies of the image required by the selected layout.

When the paper size used in the printing is larger, or when the recording medium has low quality, there is a high possibility that the user selects the layout in which the plurality of images is printed. Therefore, it is convenient that the number of copies of the decoded image is determined in accordance with the size or kind of the paper selected by the paper selecting means. Therefore, there is also the method in which, after Step S1403 and Step S1404 are finished, another thread is started up to decode the plurality of copies of the image which should be printed in the first several sheets in the images which are designated to the printing. In these cases, in Step S1409, the decoded image data for the plurality of sheets is transmitted to the printer. When the decoding processing of Step S1407 is finished, it is confirmed whether the print instruction button 507 is already depressed or not (Step S1414). When the print instruction button 507 is depressed, the flow goes to Step S1409. When the print instruction button 507 is not depressed yet, the flow goes to Step S1408 to wait for the depression of the print instruction button 507. When the confirmation of the depression of the print instruction button 507 in Step 1408 or Step S1414 is made, the first image data which has been decoded is transmitted to the printer driver in Step S1409. In Step S1410, a parameter X is initialized to X=2 so that the processing can be performed from the second image file. In Step S1411, the parameter X and the number of copies N of the selected image are compared to each other. When the parameter X is not more than the number of copies N, the flow goes to Step S1412. When the parameter X is more than the number of copies N, the flow returns to Step S1411. Thus, the printing data can be quickly transmitted to the printer driver by previously decoding the image file to be printed in the first sheet before the user depresses the print instruction button 507. As a result, the processing time for starting the actual printing can be shortened, and the waiting time of the user can be reduced.

Particularly, the start of the printing processing can be hastened by decoding the image to be printed first sheet in the selected layout, before the printing instruction is given.

The invention can be applied to a system including a plurality of apparatuses such as a host computer, an interface device, a reader, and a printer, and the invention can be also applied to the system including single apparatus such as a copying machine and a facsimile machine.

The invention also includes the mode in which the program code of the software for realizing the functions of the above-described embodiment is supplied to the computer in the apparatus or system connected to various kinds of devices and the various kinds of devices are operated according to the program stored in computer (CPU or MPU) of the system or apparatus so that various devices are operated in order to realize the functions of the above-described embodiments.

In this case, a program code itself of the software realizes the functions of the above-described embodiment, and the program code itself and means for supplying the program code to the computer, e.g. the recording medium in which the program code is stored constitute the invention.

For example, the floppy disk, the hard disk drive, the optical disk, the magneto-optical disk, CD-ROM, the magnetic tape, a volatile memory card, and ROM can be used as the recording medium in which the program code is stored.

The functions of the above-described embodiments are realized not only in such a manner that the computer executes the supplied program code, but also in such a manner that the program code cooperates with OS (Operating System) or other applications which are running on the computer. Needless to say, in this case, the program code also included in the invention.

Further, needless to say, the invention includes the case in which, after the supplied program code is stored in the memory provided in a function extension board of the computer or a function extension unit connected to the computer, CPU or the like provided in the function extension board or the function extension unit performs a part of or the whole of the actual processing on the basis of the instruction of the program code and the functions of the above-described embodiments are realized by the processing.

As described, according to the printing device of the embodiment, the printing result is shown both one page basis and by the whole thumbnails when the user selects the layout, so that there is an advantage that an overview of the printing result can be simplified. Further, since the thumbnail image is updated in accordance with the setting of the printer and the setting of the application, the preview close to the actual printing result can be displayed, and there is also the advantage that the user can easily imagine the printing result.

Before the printing instruction is given, the decoding processing of the image to be printed in the selected layout is performed, so that the start of the printing processing can be hastened.

The invention is not limited to the above-described embodiments, and various modifications can be made without departing from the scope of the invention.

What is claimed is:

1. A printing apparatus comprising:
   first decoding means for decoding an image to provide image data for display thereof, and for storing the decoded image data for display in a memory;
   image selecting means for selecting a plurality of images to be printed;
   printing paper selecting means for selecting a size or a kind of a printing paper;
   layout selecting means for selecting a layout of printing;

preview generating means for generating a preview image of a plurality of pages of the plurality of images selected by the image selecting means, on the basis of the image data decoded by the first decoding means and the layout selected by the layout selecting means;

instructing means for providing an instruction to perform printing after the preview image generated by the preview generating means is displayed;

second decoding means for decoding an image to provide image data for printing thereof and for storing the decoded image data for printing in the memory; and printing controlling means for printing the decoded image data stored by the second decoding means, in response to the instruction to perform printing being provided by the instructing means, wherein in response to the layout being selected by the layout selecting means before the instructing means provides the instruction to perform printing, the second decoding means decodes a plurality of images which are laid out in the first page of the plurality of pages to be printed in accordance with the selected layout, from among the plurality of images selected by the image selecting means, thereby providing the decoded image data of the first page for printing thereof, wherein when the second decoding means completes decoding of the plurality of images laid out in first page of the plurality of pages to be printed, the print controlling means then confirms whether the instructing means has provided the instruction to perform printing, and controls to await the instruction to perform printing if the instructing means has not yet provided the instruction to perform printing, and wherein if the instruction to perform printing is provided by the instructing means while the print controlling means is awaiting the instruction, the second decoding means decodes the images which are laid out in the second and subsequent pages of the plurality of pages to be printed in accordance with the selected layout.

2. An apparatus according to claim 1, further comprising storing means for storing a plurality of compressed image data, wherein each of the first decoding means and the second decoding means includes readout means for reading out the compressed image data from the storing means.

3. A printing method comprising:

a first decoding step of decoding an image to provide image data for display thereof, and for storing the decoded image data for display in a memory;

an image selecting step of selecting a plurality of images to be printed;

a printing paper selecting step of selecting a size or a kind or a printing paper;

a layout selection step of selecting a layout of printing;

a preview generating step of generating a preview image of a plurality of pages of the plurality of images selected in the image selecting step, on the basis of the image data decoded in the first decoding step and the layout selected in the layout selecting step;

an instructing step of providing an instruction to perform printing after the preview image generated in the preview generating step is displayed;

a second decoding step of decoding, in response to the layout being selected by the layout selection step before the instruction to perform printing is provided in the instructing step, a plurality of images which are laid out in the first page of the plurality of pages to be printed according to the selected layout from among the plurality of images selected in the image selecting step, to provide the decoded image data for printing;

a control step of confirming whether the instructing step has provided the instruction to perform printing, when the second decoding step completes decoding of the plurality of images laid out in first page of the plurality of pages to be printed, and controlling to wait for the instructing step to provide the instruction to perform printing if the instructing step has not yet provided the instruction to perform printing; and a third decoding step of decoding the images which are laid out in the second and subsequent pages of the plurality of pages to be printed in accordance with the selected layout, to provide the decoded image data for printing, if the instruction to perform printing is provided while the control step is awaiting the instruction to perform printing.

4. A method according to claim 3, further comprising a storing step of storing a plurality of compressed image data in storing means, wherein each of the first decoding step and the second decoding step includes a readout step of reading out the compressed image data from the storing means.

* * * * *